(12) United States Patent
Song

(10) Patent No.: US 8,597,822 B2
(45) Date of Patent: Dec. 3, 2013

(54) IMPACT RESISTANT BATTERY PACK

(75) Inventor: Young Bae Song, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 308 days.

(21) Appl. No.: 12/318,896

(22) Filed: Jan. 12, 2009

(65) Prior Publication Data

US 2009/0186268 A1      Jul. 23, 2009

(30) Foreign Application Priority Data

Jan. 14, 2008   (KR) .................. 10-2008-0003999

(51) Int. Cl.
*H01M 2/00*      (2006.01)
(52) U.S. Cl.
USPC ........................................... 429/163
(58) Field of Classification Search
IPC ..................... H01M 2/00,2/10, 10/04, 10/42
See application file for complete search history.

(56) References Cited

U.S. PATENT DOCUMENTS

| | | | |
|---|---|---|---|
| 2004/0241541 A1 | 12/2004 | Watanabe et al. | |
| 2007/0017720 A1 * | 1/2007 | Fujii et al. | 180/68.5 |
| 2008/0233472 A1 | 9/2008 | Ota et al. | |

FOREIGN PATENT DOCUMENTS

| | | | |
|---|---|---|---|
| EP | 1 814 189 A1 | | 8/2007 |
| EP | 1814189 A1 * | | 8/2007 |
| JP | 2001-250525 A | | 9/2001 |
| JP | 2004-152655 | | 5/2004 |
| JP | 2005-183157 A | | 7/2005 |
| JP | 2005-183242 A | | 7/2005 |
| JP | 2005183242 A | * | 7/2005 |
| JP | 2006-004783 A | | 1/2006 |
| JP | 2006-147193 A | | 6/2006 |
| JP | 2006-164531 A | | 6/2006 |
| JP | 2006147193 A | * | 6/2006 |
| JP | 2007-035520 A | | 2/2007 |
| JP | 2007035520 A | * | 2/2007 |
| JP | 2007273375 A | * | 10/2007 |
| KR | 20-1998-0036265 U | | 9/1998 |

OTHER PUBLICATIONS

Gillespie, LaRoux, "Deburring and Edge Finishing Handbook", Copyright 1999, Society of Manufacturing Engineers, pp. 100-103.*
Gillespie, LaRoux, "Deburring and Edge Finishing Handbook", 1999, Society of Manufacturing Engineers, pp. 100-103.*

* cited by examiner

*Primary Examiner* — Ula C Ruddock
*Assistant Examiner* — Daniel Gatewood
(74) *Attorney, Agent, or Firm* — Lee & Morse, P.C.

(57) ABSTRACT

A battery pack including a cell having a surface including a coupling groove, a circuit board electrically connected to the cell, a coupling member coupled to the cell, having one end coupled to the circuit board and another end having a coupling hole corresponding to the one coupling groove, a cover surrounding the circuit board, mounted on one surface of the cell, and having a through-hole, a screw coupled to the coupling groove through the through-hole, and an elastic supporting member disposed between a head part of the screw and the coupling member.

17 Claims, 9 Drawing Sheets

IMPACT RESISTANT BATTERY PACK

BACKGROUND OF THE INVENTION

1. Field of the Invention

Embodiments relate to an impact resistant battery pack.

2. Description of the Related Art

A rechargeable battery may be formed by electrically connecting a cell, formed by sealing a can accommodating an electrode assembly and electrolyte, and a circuit board. The cell may charge/discharge electricity using a chemical reaction. The circuit board may control the charge/discharge of the cell and prevent overcharge/overdischarge of the cell, to protect the cell.

When the cell and the circuit board are connected to form the rechargeable battery, electrical resistance therebetween may be reduced in order to improve charge/discharge efficiency. If the electrical resistance between the cell and the circuit board increases, the charge/discharge efficiency of the cell may be reduced.

The rechargeable battery may be mounted in an electronic product after being formed in a pack by integrally connecting a cell, a circuit board, and a cover for surrounding the circuit board. However, the electrical resistance between the cell and the circuit board may be increased due to an external force. For example, the electrical resistance may increase as contact resistance increases where the cell and the circuit board are connected.

SUMMARY OF THE INVENTION

It is therefore a feature of an embodiment to provide a battery pack that does not exhibit an increase in contact resistance when an impact is applied.

It is therefore another feature of an embodiment to provide a battery pack wherein a cell, a circuit board, and a cover are integrally connected in order to avoid an increase in contact resistance when an external force is applied to the battery pack.

It is therefore another feature of an embodiment to provide a battery pack having improved impact resistance and ease of assembly through the use of an integrally formed support member.

At least one of the above and other features and advantages may be realized by providing a battery pack, including a cell having a surface including a coupling groove, a circuit board electrically connected to the cell, a coupling member coupled to the cell, having one end coupled to the circuit board and another end having a coupling hole corresponding to the one coupling groove, a cover surrounding the circuit board, mounted on one surface of the cell, and having a through-hole, a screw coupled to the coupling groove through the through-hole and an elastic supporting member disposed between a head part of the screw and the coupling member.

The cover may include a mounting groove, the through-hole may pass through a center of the mounting groove, and the screw may be mounted in the mounting groove through the through hole.

The elastic supporting member may be in the shape of a cylinder-type washer, and a sidewall of the washer may have a height that is greater than its thickness.

The elastic supporting member may be in the through-hole, and one end of the elastic supporting member may protrude higher than a contact part of the mounting groove.

One end of the elastic supporting member may be flush with a contact part of the mounting groove.

The elastic supporting member may include a combining part having a center hole in a center of the elastic supporting member, coupled to the coupling member through the through-hole, and a hoop part connected to the combining part, the hoop part may be coupled to the mounting groove, protruding from a circumferential surface of the combining part, and having a diameter greater than a diameter of the combining part.

The elastic supporting member may include a combining part in the through-hole of the cover, and having a center hole in the center of the elastic supporting member, and a hoop part connected to the combining part, protruding from a circumferential surface of the combining part, and having a diameter greater than a diameter of the combining part, wherein a bottom surface of the hoop part may be coupled to the mounting groove of the cover and a top surface of the hoop part is coupled to the screw.

The elastic supporting member may have a cylinder shape, a sidewall of the washer having a height that is greater than its thickness, and includes a bending part that protrudes outward at an outer circumferential surface of the elastic supporting member.

A diameter of the coupling groove in the cell may be inversely proportional to a depth of the coupling groove.

The coupling groove may include a burr prevention space adjacent to the coupling member, the burr prevention space having a diameter d2, and a main coupling groove area, the main coupling groove area having a diameter d1, and the diameter of the burr prevention space d2 is greater than the diameter of the main coupling groove area d1.

The diameter d2 of the burr prevention space may be about 10 to about 30% greater than the diameter d1 of the main coupling groove area.

The cover may be coupled to the coupling member and the coupling member may be in contact with the cell.

The coupling member may include a first region soldered to the circuit board, a second region bent substantially perpendicular in the first region, and a third region including the coupling hole, and bent to be substantially perpendicular to the second region and away from the first region.

The elastic supporting member may be in the shape of a cylinder-type washer, and a sidewall of the washer may have a height that is greater than its thickness.

The elastic supporting member may be coupled to the through-hole through at least one of thermally inserting, tightly inserting, bonding, and screw coupling.

The elastic supporting member may include a combining part having a center hole in a center of the elastic supporting member, and a hoop part connected to the combining part, protruding from a circumferential surface of the combining part, and having a diameter greater than a diameter of the combining part, wherein the combining part is coupled to the coupling hole, and the hoop part is coupled to the coupling member.

A diameter of the coupling groove may be inversely proportional to a depth of the coupling groove.

The coupling groove may include a burr prevention space adjacent to the coupling member and having a diameter d2, and a main coupling groove area having a diameter d1, and the diameter of the burr prevention space d2 is greater than the diameter of the main coupling groove area d1.

The diameter d2 of the burr prevention space may be about 10 to about 30% greater than the diameter d1 of the main coupling groove area.

The cover may be coupled to the coupling member and the coupling member may be in contact with the cell.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1A:
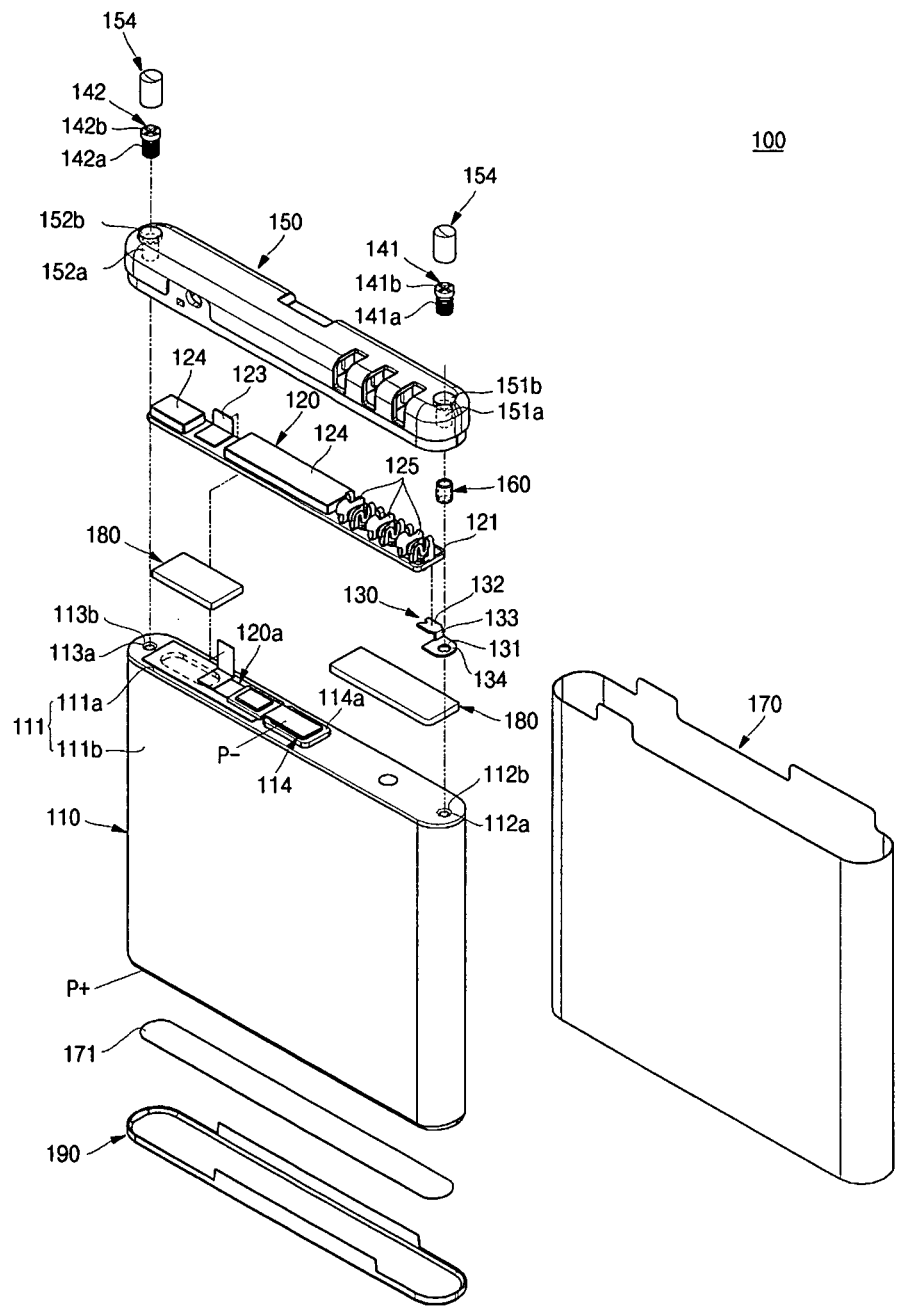
FIG. 1A illustrates an exploded perspective view of a battery pack according to an embodiment.
Figure 1B:
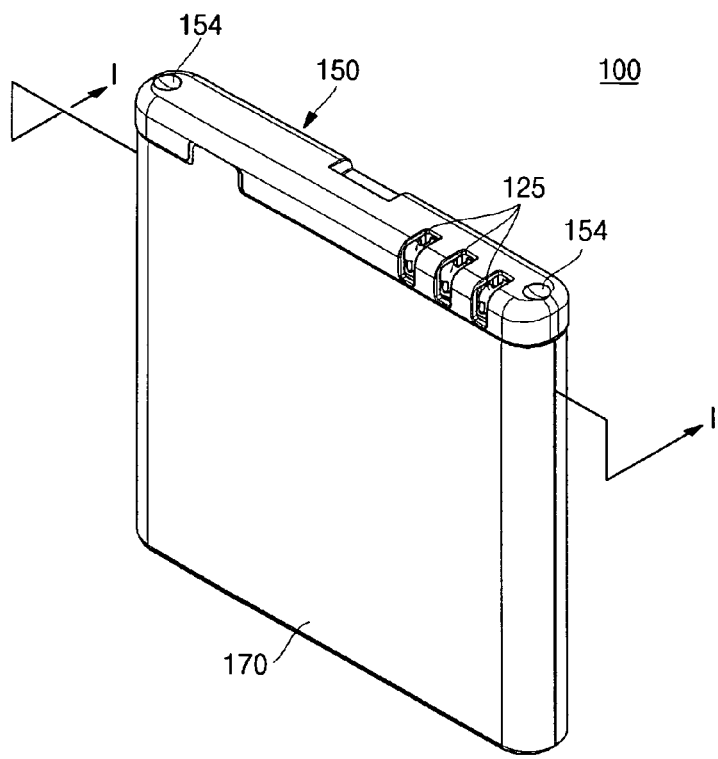
FIG. 1B illustrates a perspective view of an assembled state of the battery pack of FIG. 1A.

Korean Patent Application No. 10-2008-0003999, filed on Jan. 14, 2008, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an nth member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

As used herein, the terms "a" and "an" are open terms that may be used in conjunction with singular items or with plural items.

Referring to FIGS. 1A through 1D, a battery pack 100 according to an embodiment may include a cell 110, a circuit board 120, a coupling member 130, screws 141 and 142, a cover 150, and an elastic supporting member 160. The battery pack 100 may further include a label 170, elastic pads 180, and a support case 190.

In an embodiment, the screws 141 and 142 may include a first screw 141 and a second screw 142. Coupling grooves 112a and 113a formed in the cell 110 may include a first coupling groove 112a and a second coupling groove 113a. Through-holes 151a and 152a formed in the cover 150 may include a first through-hole 151a and a second through-hole 152a. Mounting grooves 151b and 152b respectively formed at outer edges of the through-holes 151a and 152a may include a first mounting groove 151b and a second mounting groove 152b.

Figure 1C:
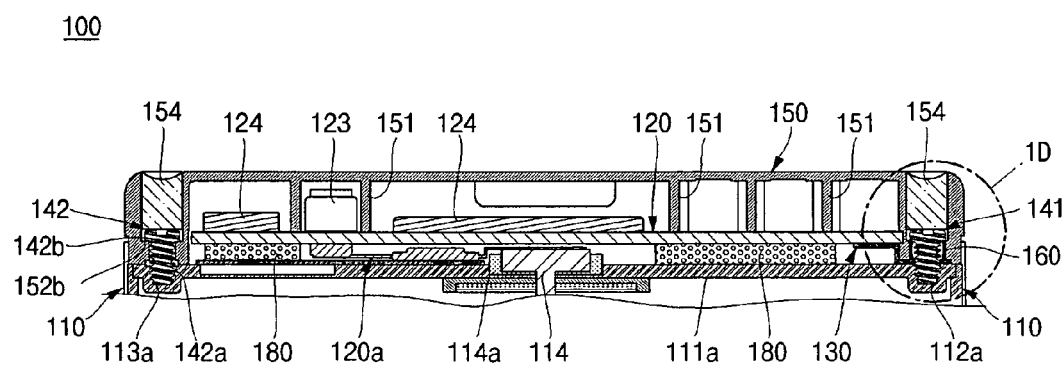
FIG. 1C illustrates a partial cross-sectional view taken along the line I-I of FIG. 1B.
Figure 1D:
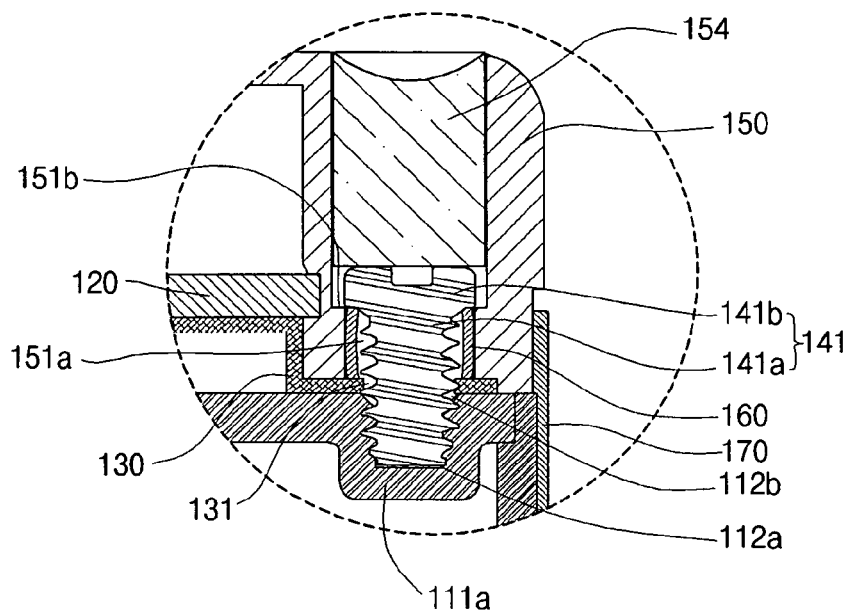
FIG. 1D illustrates an enlarged cross-sectional view of FIG. 1C partially illustrating a peripheral portion of a screw.
Figure 1E:
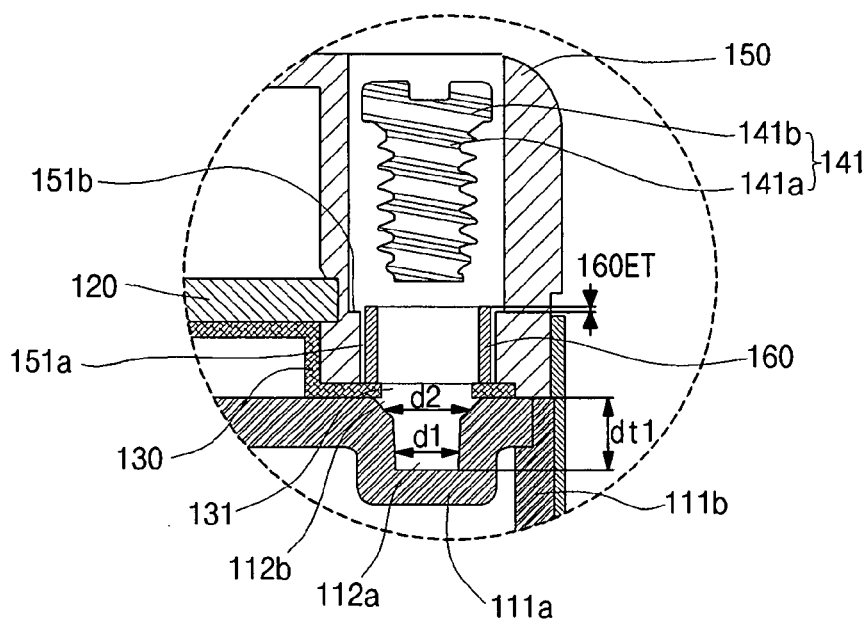
FIG. 1E illustrates a partial cross-sectional view of FIG. 1D of a separated state of the screw.

The cell 110 may be a can-type battery having a positive electrode P+ and a negative electrode P−. The cell 110 may be a bare cell. The first coupling groove 112a and the second coupling groove 113a may be formed at each end, respectively, of a surface of an outer part of the cell 110. The first screw 141 may be coupled to the first coupling groove 112a. The second screw 142 may be coupled to the second coupling groove 113a. A screw thread may be formed in an inner circumferential surface of the first coupling groove 112a and the second coupling groove 113a by the first screw 141 and the second screw 142, respectively. The first and second coupling grooves 112a and 113a, may have an opening part and a general coupling groove area. In the opening part, burr prevention spaces 112b and 113b, having a greater diameter than that of the general coupling groove area, may be formed. As illustrated in FIG. 1E, the diameter d2 of the burr prevention space 112b may be greater by 10 to 30% than the diameter d1 of the general coupling groove area. The depth dt1, of the coupling groove, may be inversely proportional to the diameter d1 of the general coupling groove area.

The cell 110 may be a can-type battery, in which an electrode assembly (not shown) formed by winding a positive electrode plate (not shown), a negative electrode plate (not shown), and a separator (not shown) may be sealed with a sealing assembly 111, formed of a metal material, e.g., aluminum. The first coupling groove 112a and the second coupling groove 113a may be formed in the sealing assembly 111. The sealing assembly 111 may include a metal-type can 111b having an open end and a cap plate 111a closing the open end. An electrode terminal 114, which may be insulated by an insulator 114a, may be formed in the metal type can 111b and/or the cap plate 111a. In FIGS. 1A and 1C, the electrode terminal 114, which may be insulated by the insulator 114a, may be inserted into the cap plate 111a. The positive electrode of the cell 110 may be electrically connected to the sealing assembly 111. The negative electrode of the cell 110 may be electrically connected to the electrode terminal 114. The electrode terminal 114, which may be the negative electrode of the cell 110, and the sealing assembly 111, which may be the positive electrode of the cell 110, may have a different polarity. One pole of the electrode assembly may be electrically connected to the sealing assembly 111, and another pole thereof may be connected to the electrode terminal 114. In an embodiment, the electrode terminal 114 may be electrically connected to the negative electrode plate of the electrode assembly to form the negative electrode, and the sealing assembly 111 may be electrically connected to the positive electrode plate of the electrode assembly to form the positive electrode.

The circuit board 120 may be electrically connected to the cell 110. The circuit board 120 may be a protective circuit board configured to control the charge/discharge of the cell and prevent overcharge/overdischarge of the cell, to protect the cell. The electrical connection between the circuit board 120 and the cell 110 may be made by connecting the negative electrode of the circuit board 120 to the electrode terminal 114 by a lead tab 120a, and by connecting the positive electrode of the circuit board 120 to the sealing assembly, by the coupling member 130. A positive temperature coefficient (PTC) device electrically connected between the negative electrode of the circuit board 120 and the electrode terminal 114 may block the electrical connection between the negative electrode of the circuit board 120 and the electrode terminal 114 when the temperature and/or the current gets too high. The circuit board 120 may include an insulating substrate 121, a printed circuit pattern (not shown), a conducting pad 123, a protection circuit unit 124, and a charging/discharging terminal 125. The conducting pad 123, the protection circuit unit 124, and the charging/discharging terminal 125 may be soldered to the printed circuit pattern formed on the insulating substrate 121. The protection circuit unit 124 may include a passive element, e.g., a resistor, a condenser, etc., an active element, e.g., a field-effect transistor, a safety element such as the PTC device, and integrated circuits. The protection circuit unit 124 may charge or discharge the cell 110 when the cell 110 is charged/discharged, and may block a charging/discharging path of the cell 110 when the cell 110 is overheated or the current is too high, thereby preventing, e.g., lifetime degradation, overheating, explosion, etc., of the cell 110.

One end of the coupling member 130 may be soldered and connected to the circuit board 120, and another end thereof may be in contact with the cell 110. On a surface where the coupling member 130 is in contact with the cell 110, a coupling hole 131 corresponding to the first coupling groove 112a of the cell 110 may be formed. The coupling member 130 may support the circuit board 120, and may electrically connect the positive electrode of the circuit board 120 and the cell 110. The coupling member 130 may include a first region 132, a second region 133, and a third region 134. The first region 132 of the coupling member 130 may be soldered and connected to the circuit board 120. The second region 133 of the coupling member 130 may be bent to be substantially perpendicular to the first region 132. The third region 134 of the coupling member 130, in which the coupling hole 131 may be formed, may be bent in an opposite direction and substantially perpendicular to the second region 133. The second and third regions 133 and 134 of the coupling member 130 may be bent, so that the circuit board 120 and a surface of the cell 110 are in parallel to each other. The first coupling groove 112a formed in the cell 110 and the coupling hole 131 of the coupling member 130 may correspond to each other, so that the first screw 141 may be coupled substantially perpendicularly to the cell 110. The coupling member 130 may be formed of nickel or a nickel alloy, so that coupling and conductivity between the coupling member 130 and the protection circuit board 120 by soldering may be enhanced.

The first screw 141 may be coupled to the first coupling groove 112a through the coupling hole 131 of the coupling member 130. The second screw 142 may be coupled to the second coupling groove 113b. The first and second screws 141 and 142 may include body parts 141a and 142a and head parts 141b and 142b. The body parts 141a and 142a of the first and second screws 141 and 142 may be screw-coupled to the first coupling groove 112a and the second coupling groove 113a, respectively, forming a screw thread thereon. The head parts 141b and 142b of the first and second screws 141 and 142 may be formed on the upper part of the body parts 141a and 142a, and have a diameter greater than that of the body parts 141a and 142a. Any suitable screw heads may be used in the head parts 141b and 142b of an embodiment, e.g., phillps head, flat head, etc. A screw driver may be inserted into the grooves 141b1 and 142b1 so that the first and second screws 141 and 142 may be screw-coupled to the coupling grooves 112a and 113a, respectively.

The cover 150 may surround the circuit board 120. The first mounting groove 151b and the second mounting groove 152b may be formed in the cover 150. The first through-hole 151a and the second through-hole 152a may pass through the centers of the first and second mounting grooves 151b and 152b, respectively. The body part 141a of the first screw 141 may pass through the first through-hole 151a. The head part 141b of the first screw 141 may be tightly coupled to the first mounting groove 151b. The body part 142a of the second screw 142 may pass through the second through-hole 152a. The head part 142b of the second screw 142 may be tightly coupled to the second mounting groove 152b. The cover 150 may be a plastic case formed by injection molding a resin material, e.g., polycarbonate. The cover 150 may protect the circuit board 120 against an external force and prevent a short circuit of the circuit board 120. Ribs 151 may be formed inside the cover 150 and support a top surface of the circuit board 120 so that the circuit board 120 may be tightly coupled to the cell 110. After the cover 150 is coupled to the circuit board 120, the cover 150 and the cell 110 may be surrounded by the label 170. The charging/discharging terminal 125 may be exposed to the outside by a charging/discharging terminal hole formed in the cover 150. Sealing members 154 may be inserted into the first and second mounting grooves 151b and 152b, respectively. The sealing members 154 may prevent penetration of impurities from the outside by sealing the first and second mounting grooves 151b and 152b.

The elastic supporting member 160 may be disposed, and provide support, between the first screw 141 and the coupling member 130. The elastic supporting member 160 may be formed of a metal material in the shape of a cylinder-type washer. The elastic supporting member 160 may be inserted into the first through-hole 151a while surrounding the body part 141a of the first screw 141, to lend support between a bottom surface of the head part 141b and a top surface of the coupling member 130. The elastic supporting member 160 may protrude higher, by a specific height 160ET, than the height of the first through-hole 151a, as illustrated in FIG. 1E. The elastic supporting member 160 may protrude upward, by the specific height 160ET, from a bottom surface of the first mounting groove 151b.

The label 170 may surround the cell 110 and the cover 150. The label 170 may attach to the cell 110 and the cover 150 by an adhesive. Information, e.g., the capacity and serial number of the battery pack 100, may be printed on an outer surface of the label 170.

The elastic pad 180 may support the circuit board 120 and the cell 110. The elastic pad 180 may be formed of, e.g., silicon, rubber, and/or a foam tape, including a porous material. The elastic pad 180 may be formed on both sides of the battery pack between the cell 110 and the circuit board 120.

The support case 190 may surround corner parts of the cell 110, thereby preventing the corner parts of the cell 110 from being deformed when an external force is applied. A double-side tape 171 may be formed between the support case 190 and the cell 110 to couple the support case 190 to the cell 110. An outer surface of the support case 190 may be surrounded by the label 170, so that the coupling between the support case 190 and the cell 110 may be enhanced.

Hereinafter, the operation and advantages of a battery pack 100 according to an embodiment will be described in detail.

The battery pack 100 may prevent the contact resistance between the coupling member 130 and the cell 110 from being increased because the elastic supporting member 160 may provide support between the first screw 141 and the coupling member 130. More specifically, the elastic supporting member 160 may enhance coupling when the first screw 141 is coupled to the first coupling groove 112a, and may prevent an increase in the contact resistance between the coupling member 130 and the cell 110 due to an external force. The elastic supporting member 160 may also function to prevent the first screw 141 from coming loose due to an external force. The elastic supporting member 160 may be deformed outward from a central circumference as the first screw 141 is screw-coupled to the first coupling groove 112a. The elastic supporting member 160 may push against the first through-hole 151a formed in the cover 150. Accordingly, the elastic supporting member 160 may be tightly inserted into the cover 150 to prevent movement of the cover 150. Movement of the coupling member 130 may also prevented, so that it may be possible to prevent the contact resistance between the coupling member 130 and the cell 110 from being increased.

As illustrated in FIG. 1E, the elastic supporting member 160 may protrude higher, by the specific height 160ET, than the height of the first through-hole 151a. The elastic supporting member 160 may protrude upward, by the specific height 160ET, from the bottom surface of the first mounting groove 151b, which is a boundary between the first through-hole 151a and the first mounting groove 151b. Thus, the head part 141b of the first screw 141 may not be in contact with the first mounting groove 151b, and the elastic supporting member 160 may be curved outward in an amount relative to the specific height 160ET. Therefore, the first screw 141 may apply pressure to the elastic supporting member 160 when coupling to the first coupling groove 112a, so that an outer circumferential part of the elastic supporting member 160 may be curved outward to push against an inner circumferential part of the first mounting groove 151b. Accordingly, the movement of the cover 150 may be prevented by the curved deformation of the elastic supporting member 160.

One side of the coupling member 130 may be soldered to the circuit board 120. The other side of the coupling member 130 may be bent to be in contact with a surface of the cell 110. The coupling member 130 may include a first region 132, a second region 133 bent substantially perpendicularly to the first region, and a third region 134 bent substantially perpendicularly to the second region 133 in a direction away from the first region 132. The aforementioned regions 132, 133, and 134 may provide a structure for the coupling member 130 to support the circuit board 120, to be screw-coupled to the cell 110, and to increase the contact area between the first screw 141 and the cell 110. Accordingly, the contact area between the coupling member 130 and the cell 110 may be increased, thereby lowering contact resistance.

The first and second screws 141 and 142 may be coupled to the first and second coupling grooves 112a and 113a, respectively, so that the circuit board 120 is not distorted. Since the coupling strength between the first screw 141 and the coupling member 130 may be greater than in a conventional battery pack, the contact resistance between the coupling member 130 and the cell 110 may not be increased due to an external force.

In the first screw 141, the head part 141b may apply pressure to a top surface of the elastic supporting member 160 while the body part 141a is inserted through the elastic supporting member 160.

The coupling member 130 may be coupled tightly to the cell 110 by the elastic supporting member 160, and the contact resistance between the coupling member 130 and cell 110 may not increase due to an external force.

In the cover 150, the top surface of the circuit board 120 may be supported by the ribs 151 formed inside the cover 150 so that the coupling member 130 may be tightly coupled to the cell 110. Accordingly, it may be possible to prevent the contact resistance between the coupling member 130 and the cell 110 from being increased when an external force is applied by increasing the contact force between the coupling member 130 and the cell 110.

The cover 150 may be tightly coupled to the coupling member 130 so that the coupling member 130 may in turn be tightly coupled to the cell 110. Accordingly, the contact force between the coupling member 130 and the cell 110 may increase, thereby preventing contact resistance from being increased when an external force is applied.

Since the label 170 may allow the cell 110 and the cover 150 to be coupled to each other, it may be possible to prevent the coupling member 130, the screws 141 and 142, and the elastic supporting member 160 from being moved due to an external force by preventing movement of the cover 150. Accordingly, the label 170 may prevent the contact resistance between the coupling member 130 and the cell 110 from being increased.

Because the elastic pad 180 may support the coupling member 130 and the cell 110 and absorb an impact applied from the outside, it may be possible to prevent the contact resistance between the coupling member 130 and the cell 110 from being increased. The elastic pad 180 may be mounted on the cell 110 to provide an elastic force for pushing against the circuit board 120. Accordingly, the coupling member 130 soldered to the circuit board 120 may push against the elastic supporting member 160 upwardly to enhance coupling. Therefore, loosening of the first and second screws 141 and 142 may be prevented, and the contact resistance between the coupling member 130 and the cell 110 may not be increased due to an external force.

Figure 1F:
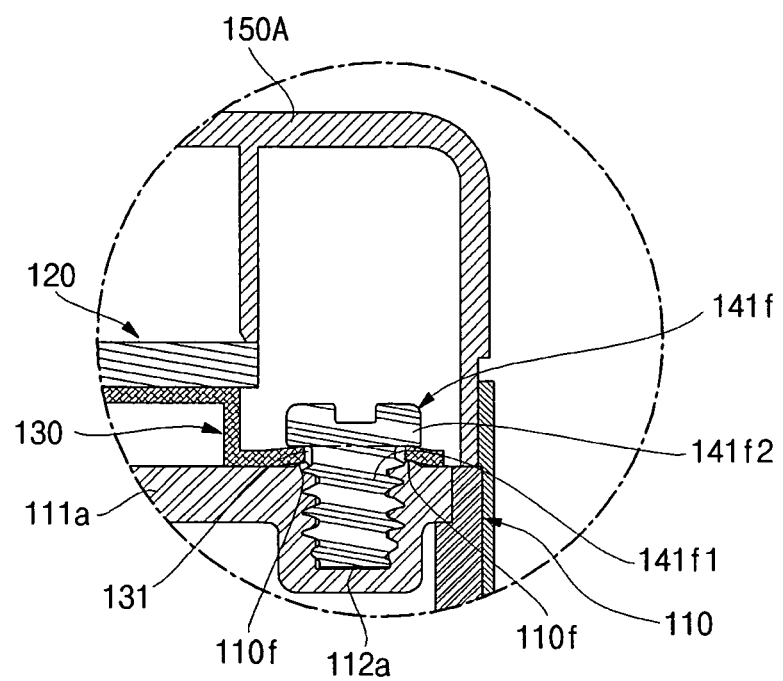
FIG. 1F illustrates a partial cross-sectional view of a comparative example of the screw of FIG. 1E.

When the coupling member 130 is coupled to the first coupling groove 112a by the first screw 141, the battery pack 100 may not increase the contact resistance between the coupling member 130 and the cell 110, even when an external force is applied to the battery pack 100. Referring to the conventional coupling system illustrated in FIG. 1F, a screw 141f may be coupled to the first coupling groove 112a, as the first coupling groove 112a is formed in the cell 110. As illustrated in FIG. 1F, when the coupling member 130 is coupled to the cell 110 by the screw 141f, a burr 110f may be generated. When a body part 141f/1 of the screw 141f is screw-coupled to the first coupling groove 112a, the burr 110f is formed by pushing a top surface of the first coupling groove 112a with the body part 141f/1. Then, the burr 110f protrudes from the top surface of the first coupling groove 112a and below a head part 141f/2 of the screw 141f. When the screw 141f is coupled to the coupling groove 112a, the coupling member 130 between the head part 141f/2 of the screw 141f and the first coupling groove 112a of the cell 110 may be tightly coupled to the burr 110f, which may reduce coupling area. When an external impact is applied to the cell 110, the coupling member 130 may move up and down, which may further reduce the coupling area between the burr 110f and the coupling member 130. Therefore, contact resistance between the cell 110 and the coupling member 130 may increase.

In an embodiment, the first coupling groove 112a may include a first burr prevention space 112b and a general coupling groove area. The first burr prevention space 112b may have a diameter greater than that of the general coupling groove area of the first coupling groove 112a. The first burr prevention space 112b may be formed in an opening part of the first coupling groove 112a in which a burr would be formed, in order to prevent a burr 110f from forming, as illustrated in FIG. 1E. Therefore, since the area where the burr would be formed may be removed, if an external impact is applied to the cell 110 and the circuit board 120, contact resistance between the cell 110 and the coupling member 130 may not increase, thereby enhancing reliability of the battery pack 110.

Since the diameter d1 of the general coupling groove area of the first coupling groove 112a may be inversely proportional to the depth dt1 of the first coupling groove 112a, the battery pack 100 may enhance the coupling strength between the first screw 141 and the cell 110. More specifically, when the screw 141 is screw-coupled to the first coupling groove 112a by passing through the coupling hole 131 of the coupling member 130, the diameter d1 of a general coupling groove area of the first coupling groove 112a may be small, which may increase the coupling strength between the first screw 141 and the first coupling groove 112a.

Since the diameter d2 of the first burr prevention space 112b of the first coupling groove 112a may be greater than the diameter d1 of the general coupling groove area, a burr may not be generated. The first burr prevention space 112b having the diameter d2, greater than the diameter d1 of the general coupling groove area of the first coupling groove 112a, may be formed in an opening part of the first coupling groove 112a to prevent generation of a burr. Therefore, the coupling between the first screw 141 and the first coupling groove 112a may be enhanced, and the generation of the burr may be prevented, so that the battery pack 100 may prevent contact resistance from being increased, even when an external force is applied to the battery pack 100.

As illustrated in FIG. 1E, the diameter d2 of the burr prevention space 112b of the first coupling groove 112a may be about 10 to about 30% greater than the diameter d1 of the general coupling groove area of the first coupling groove 112a. Maintaining the diameter d2 of the burr prevention space 112b at about 10% greater than the diameter d1 of the first coupling groove 112a or more may help ensure that a burr is not generated around the first coupling groove 112a. Maintaining the diameter d2 of the burr prevention space 112b at about 30% greater than the diameter d1 of the general coupling groove area of the first coupling groove 112a or less may help ensure that the contact area of the coupling member 130 and the cell 110 is not decreased, nor contact resistance between the coupling member 130 and the cell 110 increased. Accordingly, the diameter d2 of the burr prevention space 112b may be formed to be about 10 to about 30% greater than the diameter d1 of general coupling groove area of the first coupling groove 112a, so that the contact resistance between the coupling member 130 and the cell 110 may be maintained to a certain degree, and the generation of the burr formed around the first coupling groove 112a may be prevented, thereby reducing contact resistance.

Figure 2A:
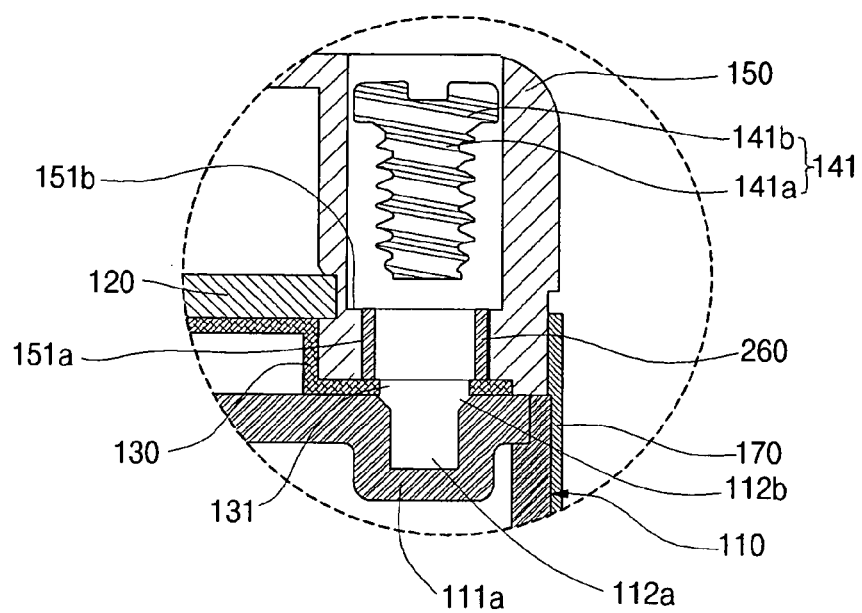
FIG. 2A illustrates a partial cross-sectional view of a battery pack according to another embodiment.
Figure 2B:
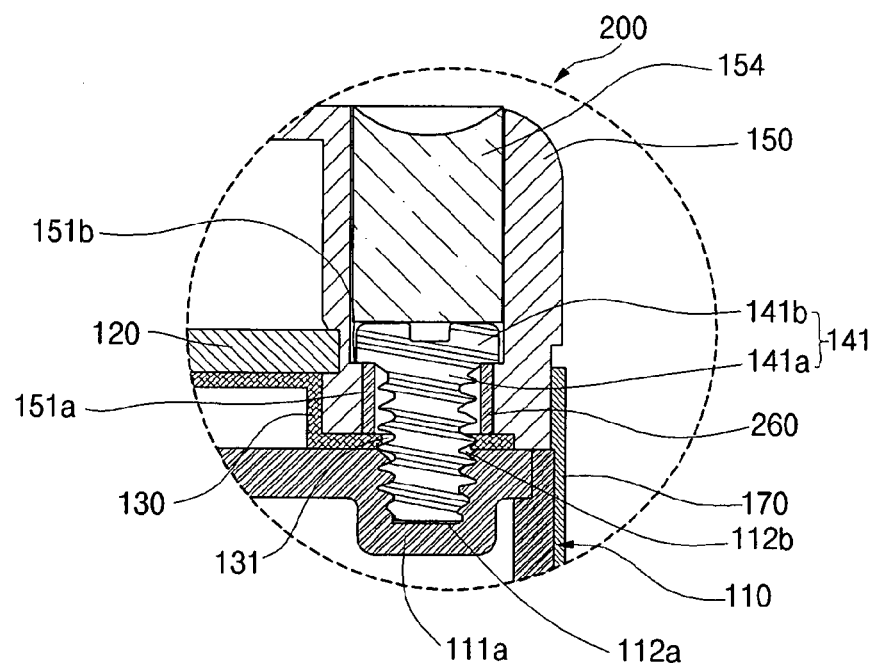
FIG. 2B illustrates a partial cross-sectional view of an assembled state of the battery pack of FIG. 2A.

As illustrated in FIGS. 2A and 2B, the battery pack 200 of an embodiment may include a cell 110, a circuit board 120, a coupling member 130, first and second screws 141 and 142, a cover 150, and an elastic supporting member 260. The battery pack 200 of an embodiment may further include a label 170, an elastic pad 180, and a support case 190, which may be described with reference to FIG. 1A. In an embodiment, the elastic supporting member 260 will now be described.

In the battery pack 200 of an embodiment, the elastic supporting member 260 may be formed in the shape of a cylinder-type washer. A top surface of the elastic supporting member 260 may be formed to have the same height as, and flush with, a first mounting groove 151b of the cover 150. A head part 141b of the first screw 141 may be tightly coupled to a bottom surface of the first mounting groove 151b and the top surface of the elastic supporting member 260.

In the battery pack 200 of an embodiment, the head part 141b of the first screw 141 may be simultaneously tightly coupled to the top surface of the elastic supporting member 260 and the bottom surface of the first mounting groove 151b. Accordingly, the head part 141b of the first screw 141 may be coupled to the first mounting groove 151b of the cover 150, thereby preventing movement of the cover 150, and the elastic supporting member 260 may tightly couple the coupling member 130 to the cell 110, thereby preventing an increase in contact resistance.

Figure 3A:
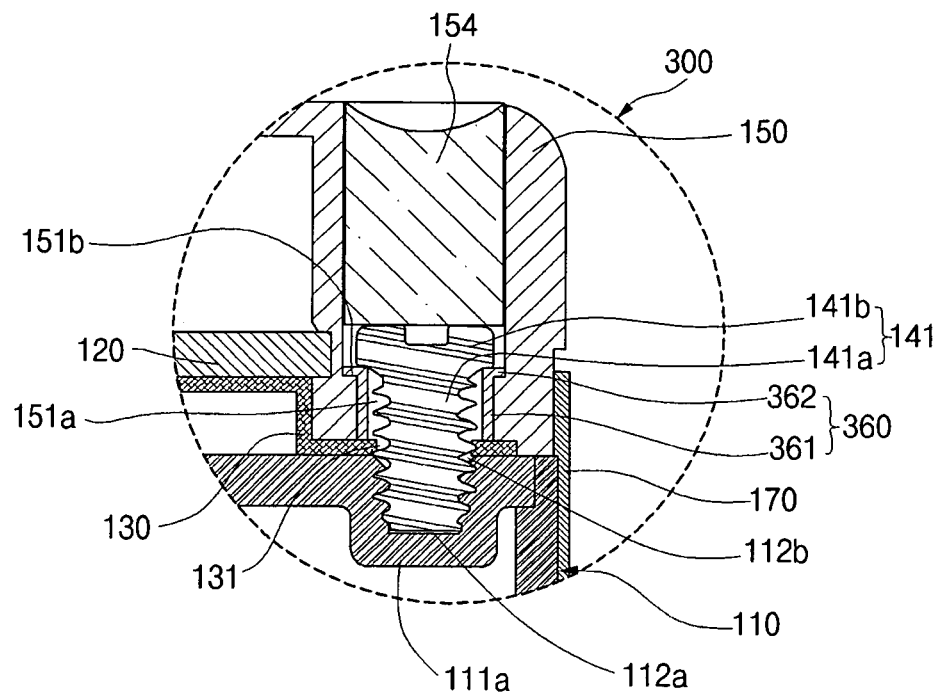
FIG. 3A illustrates a partial cross-sectional view of a battery pack according to another embodiment.
Figure 3B:
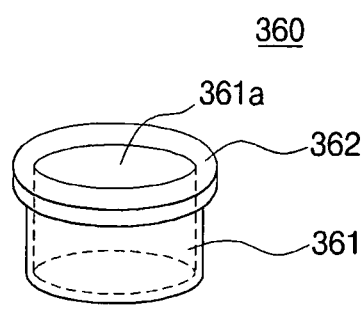
FIG. 3B illustrates a perspective view of an elastic supporting member of FIG. 3A.

As illustrated in FIG. 3A, the battery pack 300 of an embodiment may include a cell 110, a circuit board 120, a coupling member 130, a first screw 141, a cover 150, and an elastic supporting member 360. The battery pack 300 of an embodiment may further include a label 170, an elastic pad 180, and a support case 190, which may be described with reference to FIG. 1A. In an embodiment, the elastic supporting member 360 will now be described.

In the battery pack 300 of an embodiment, the elastic supporting member 360 may include a combining part 361 and a hoop part 362.

The combining part 361 may be formed in a cylinder shape and inserted into a first through-hole 151a of the cover 150. A bottom surface of the combining part 361 may be tightly coupled to the coupling member 130. A center hole 361a through which a body part 141a of the first screw 141, may pass may be formed at the center of the combining part 361.

The hoop part 362 may be connected to the combining part 361, protrude from a circumferential surface of the combining part 361, and have a greater diameter than that of the combining part 361. A bottom surface of the hoop part 362 may tightly couple to a first mounting groove 151b of the cover 150, and a top surface of the hoop part 362 may tightly couple to a bottom surface of a head part 141b of the first screw 141.

In the battery pack 300 according to an embodiment, the hoop part 362 of the elastic supporting member 360 may tightly couple to the first mounting groove 151b of the cover 150, and the combining part 361 may be inserted into a first through-hole 151a of the cover 150 to be stably mounted on the cover 150. Therefore, the head part 141b of the first screw 141 may tightly couple to the hoop part 362 of the elastic supporting member 360. The coupling member 130 may tightly couple to the cell 110 due to the pressure applied by the bottom surface of the combining part 361, so that contact resistance may not be increased due to an external force. Because the head part 141b of the first screw 141 may tightly couple to the hoop part 362 of the elastic supporting member 360, the first mounting groove 151b of the cover 150 may also tightly couple thereto, thereby preventing movement of the cover 150.

Figure 4A:
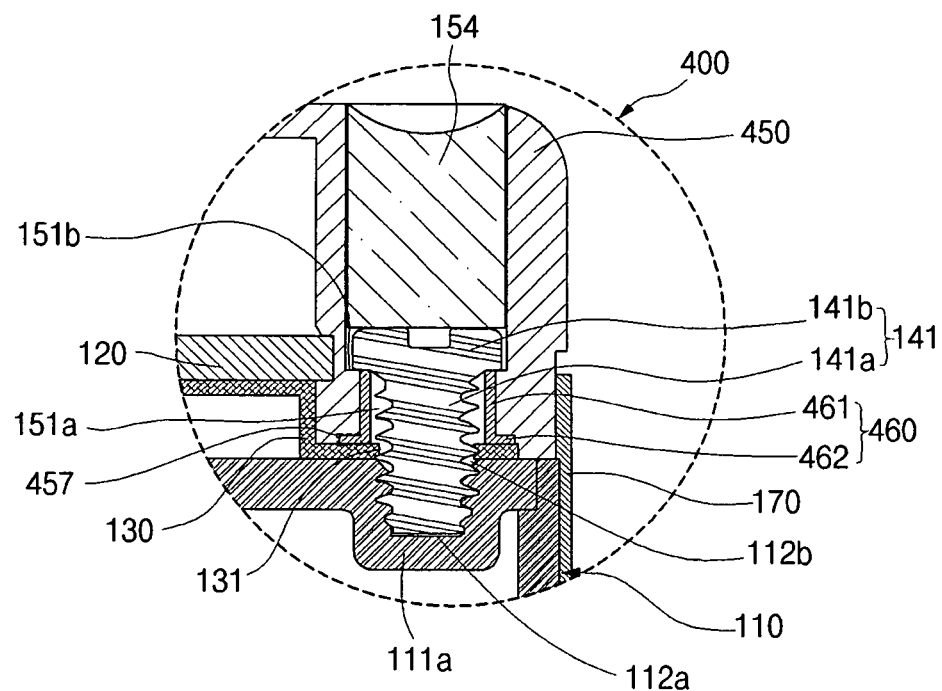
FIG. 4A illustrates a partial cross-sectional view of a battery pack according to another embodiment.

As illustrated in FIG. 4A, the battery pack 400 of an embodiment may include a cell 110, a circuit board 120, a coupling member 130, a first screw 141, a cover 450, and an elastic supporting member 460. The battery pack 400 of an embodiment may further include a label 170, an elastic pad 180, and a support case 190, which may be described with reference to FIG. 1A. In an embodiment, the cover 450 and the elastic supporting member 460 will now be described.

The cover 450 may be formed in a shape similar to the cover of the aforementioned embodiment and formed of the same material as the cover of the aforementioned embodiment. However, the cover 450 of an embodiment may be a cover providing a space 457 into which a hoop part 462 of the elastic supporting member 460 may be inserted at a lower portion of a first through-hole 151a.

The elastic supporting member 460 may include a combining part 461 and a hoop part 462.

The combining part 461 may be formed in a cylinder shape and inserted into the first through-hole 151a of the cover 450. A center hole 461a may be formed at the center of the combining part 461. A top surface of the combining part 461 may tightly couple to a bottom surface of a head part 141b of the first screw 141.

Figure 4B:
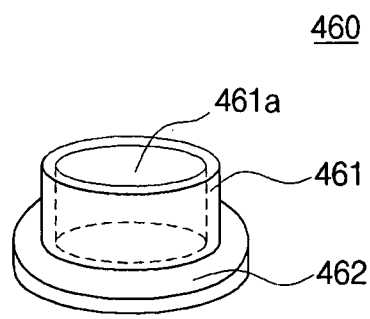
FIG. 4B illustrates a perspective view of an elastic supporting member of FIG. 4A.

The hoop part 462 may be connected to the combining part 461, protrude from a circumferential surface of the combining part 461, and have a greater diameter than that of the combining part 461. The hoop part 462 of the elastic supporting member 460 of FIG. 4B may be formed in, e.g., a circular shape to protrude from the combining part 461. The hoop part 462, however, may have any suitable shape protrude from a circumferential surface of the combining part 461.

In the battery pack 400 of an embodiment, the head part 141b of the first screw 141 may tightly couple to a first mounting groove 151b of the cover 450 and apply pressure to the top surface of the combining part 461, so that the combining part 461 may tightly couple to the coupling member 130. Because the hoop part 462 may have a greater diameter than that of the combining part 461, increasing the contact area of the elastic supporting member 460 and the coupling member 130, the hoop part 462 may strongly couple to the coupling member 130. Accordingly, the coupling member 130 may strongly couple to the cell 110, so that the battery pack 400 of an embodiment may prevent an increase in contact resistance due to an external force. Because the head part 141b of the first screw 141 may apply pressure to the top surface of the combining part 461, and may tightly couple to the first mounting groove 151b of the cover 450, preventing movement of the cover 450, the cover 450 and the cell 110 may be integrally formed.

Figure 5A:
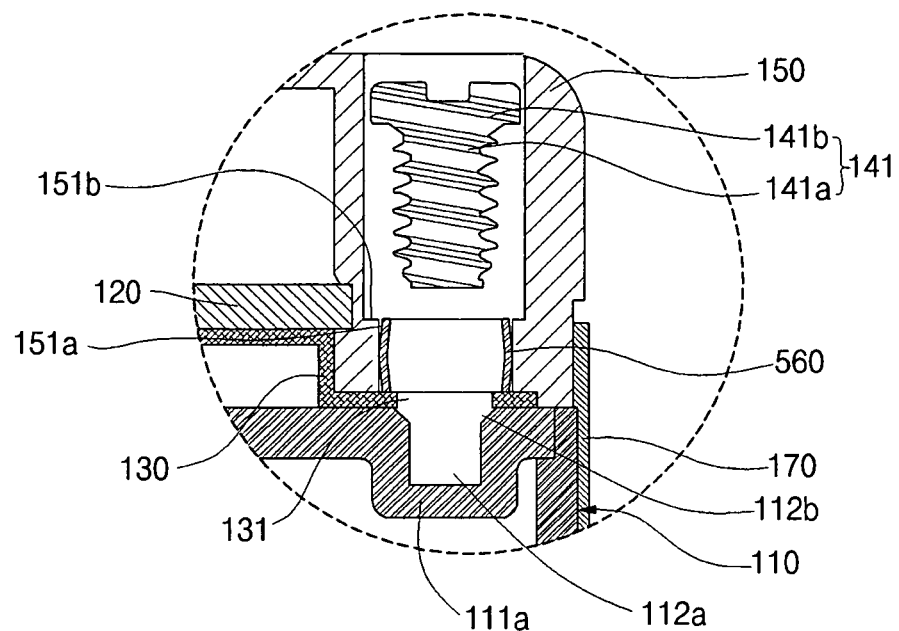
FIG. 5A illustrates a partial cross-sectional view of a battery pack according to another embodiment.
Figure 5B:
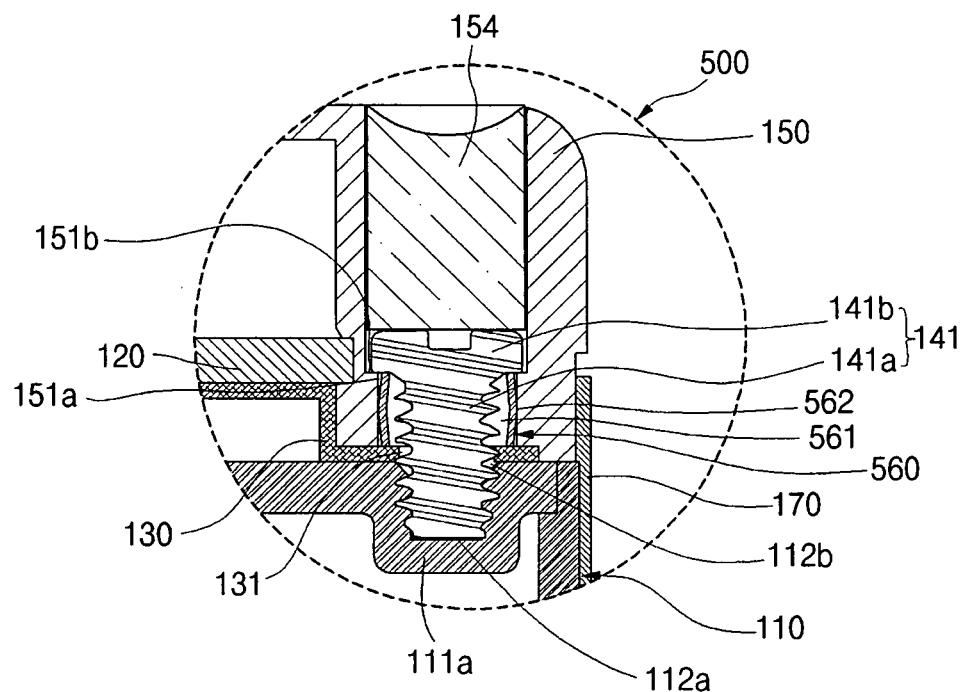
FIG. 5B illustrates a partial cross-sectional view of an assembled state of the battery pack of FIG. 5A.

As illustrated in FIGS. 5A and 5B, the battery pack 500 of an embodiment may include a cell 110, a circuit board 120, a coupling member 130, a first screw 141, a cover 150, and an elastic supporting member 560. The battery pack 500 of an embodiment may further include a label 170, an elastic pad 180, and a support case 190, which may be described with reference to FIG. 1A. In an embodiment, the elastic supporting member 560 will now be described.

Figure 5C:
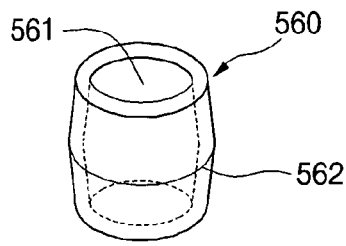
FIG. 5C illustrates a perspective view of an elastic supporting member of FIG. 5A.

In the battery pack 500 of an embodiment, the elastic supporting member 560 may be formed in the shape of a cylinder having a hole 561 formed at the center thereof. As illustrated in FIG. 5C, a bending part 562 may be formed at an outer circumferential surface of the elastic supporting member 560. The bending part 562 may protrude around the outer circumferential surface of the elastic supporting member 560 to surround the center part of the outer circumferential surface of the elastic supporting member 560. As illustrated in FIG. 5B, the elastic supporting member 560 may be inserted into a first through-hole 151a of the cover 150 and then couple tightly to the coupling member 130 and a head part 141b of the first screw 141. As the first screw 141 is screw-coupled to a first coupling groove 112a, pressure may be applied to the elastic supporting member 560 to tightly couple it to the coupling member 130. The bending part 562 of the elastic supporting member 560 may protrude outward from the outer circumferential surface of the elastic supporting member 560 and bend toward an upper part and a center part of the elastic supporting member 560. Since the elastic supporting member 560 may generate an elastic force for pushing against the head part 141b of the first screw 141 and the coupling member 130, loosening of the first screw 141 may be prevented. The coupling member 130 may be more tightly coupled to the cell 110, thereby preventing an increase in contact resistance due to an external force. The head part 141b of the first screw 141 may tightly couple to the first mounting groove 151b of the cover 150 to prevent movement of the cover 150, thereby forming an integrated battery pack.

Figure 6A:
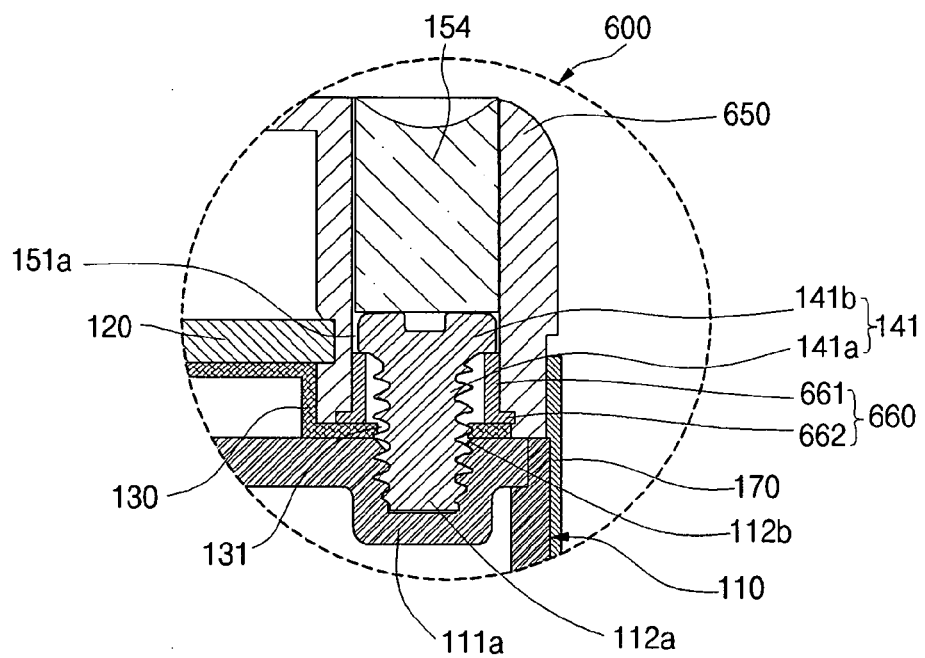
FIG. 6A illustrates a partial cross-sectional view of a battery pack according to another embodiment.
Figure 6B:
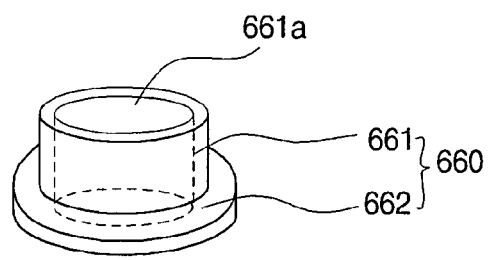
FIG. 6B illustrates a perspective view of an elastic supporting member of FIG. 6A.

As shown in FIG. 6A, the battery pack 600 of an embodiment may include a cell 110, a circuit board 120, a coupling member 130, a first screw 141, a cover 650, and an elastic supporting member 660. The battery pack 600 of an embodiment may further include a label 170, an elastic pad 180, and a support case 190, which may be described with reference to FIG. 1A. In and, the cover 650 and the elastic supporting member 660 will now be described.

The cover 650 may be formed into a structure similar to the cover of the aforementioned embodiment described with reference to FIG. 1A. However, a mounting groove formed at an upper part of a first through-hole 151a of the aforementioned embodiment may not be formed, and a space in which a hoop part 662 of the elastic supporting member 660 may be coupled to the cover 650 may be further formed.

The elastic supporting member 660 may include a combining part 661 and the hoop part 662.

The combining part 661 may be formed in a cylinder shape. A center hole 661a may be formed at the center of the combining part 661 so that a body part 141a of the first screw 141 may pass therethrough. The combining part 661 of the elastic supporting member 660 may be coupled to the first through-hole 151a by bonding or by inserting the elastic supporting member 660 into the first through-hole 151a while melting a surface of the first through-hole 151a of the cover 650. Alternatively, the combining part 661 may be coupled to the first through-hole 151a by being tightly inserted into the first through-hole 151a.

The hoop part 662 may be connected to an end of the combining part 661, protrude from a circumferential surface of the combining part 661, and have a greater diameter than that of the combining part 661. The hoop part 662 may tightly couple to the coupling member 130.

In the battery pack 600 of an embodiment, the combining part 661 of the elastic supporting member 660, while being integrally formed with the first through-hole 151a, may apply pressure downward from a head part 141b of the first screw 141. Therefore, the hoop part 662 may more tightly couple to the coupling member 130, thereby increasing the coupling strength between the elastic supporting member 660 and the coupling member 130, preventing contact resistance between the coupling member 130 and the cell 110 from being increased due to an external force. The battery pack 600 of an embodiment may prevent movement of the cover 650 by integrally forming the elastic supporting member 660 with the cover 650.

As described above, according to embodiments, a battery pack may not increase contact resistance between a cell and a circuit board when an external force is applied to the battery pack.

Further, a battery pack may be easier to assemble by integrally forming a cell, a circuit board, and a cover so that the contact resistance between the cell and the protection circuit board is not increased due to an external force.

The battery pack of an embodiment may be used in portable electronic devices, e.g., cellular phones, notebook computers, camcorders, and the like.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
   a cell having a surface including a coupling groove;
   a circuit board electrically connected to the cell;
   a coupling member, the coupling member having one end coupled to the circuit board, the coupling member having another end contacting the surface of the cell and having a coupling hole therein, the coupling hole corresponding to the coupling groove;
   a cover surrounding the circuit board, the cover contacting the surface of the cell adjacent to the coupling groove, the cover having a mounting groove and a through-hole corresponding to the coupling groove, the mounting groove surrounding the through-hole;
   a screw coupled to the coupling groove through the coupling hole and the through-hole, the screw having a head part and a body part extending from the head part, an underside of the head part contacting a bottom surface of the mounting groove; and
   an elastic supporting member contacting the underside of the head part of the screw and an upper side of the coupling member, at least a part of the elastic supporting member being inside the through-hole, the elastic supporting member being in a compressed state and exerting a restoring force against the upper side of the coupling member to bias the coupling member against the surface of the cell.

2. The battery pack as claimed in claim 1, wherein the through-hole passes through a center of the mounting groove.

3. The battery pack as claimed in claim 2, wherein the elastic supporting member is in the shape of a cylinder-type washer, and a sidewall of the washer has a height that is greater than its thickness.

4. The battery pack as claimed in claim 2, wherein one end of the elastic supporting member is flush with a contact part of the mounting groove.

5. The battery pack as claimed in claim 2, wherein the elastic supporting member has a cylinder shape, a sidewall of the elastic supporting member has a height that is greater than a thickness of the elastic supporting member, and the sidewall of the elastic supporting member includes a bending part that protrudes outward at an outer circumferential surface of the elastic supporting member.

6. The battery pack as claimed in claim 2, wherein a diameter of the coupling groove in the cell is inversely proportional to a depth of the coupling groove.

7. The battery pack as claimed in claim 2, wherein the coupling groove includes a burr prevention space adjacent to the coupling member, the burr prevention space having a diameter d2, and a main coupling groove area, the main coupling groove area having a diameter d1, and the diameter of the burr prevention space d2 is greater than the diameter of the main coupling groove area d1.

8. The battery pack as claimed in claim 7, wherein the diameter d2 of the burr prevention space is about 10 to about 30% greater than the diameter d1 of the main coupling groove area.

9. The battery pack as claimed in claim 2, wherein the cover is coupled to the coupling member and the coupling member is in contact with the cell.

10. The battery pack as claimed in claim 1, wherein the coupling member includes:
    a first region soldered to the circuit board;
    a second region bent substantially perpendicular to the first region; and
    a third region including the coupling hole, and bent to be substantially perpendicular to the second region in a direction away from the first region.

11. The battery pack as claimed in claim 1, wherein the elastic supporting member is in the shape of a cylinder-type washer, and a sidewall of the washer has a height that is greater than its thickness.

12. The battery pack as claimed in claim 1, wherein the elastic supporting member is coupled to the through-hole through at least one of thermally inserting, tightly inserting, bonding, and screw coupling.

13. The battery pack as claimed in claim 1, wherein the elastic supporting member includes:
    a combining part having a center hole in a center of the elastic supporting member; and
    a hoop part connected to the combining part, protruding from a circumferential surface of the combining part, and having a diameter greater than a diameter of the combining part,
    wherein the combining part is coupled to the coupling hole, and the hoop part is coupled to the coupling member.

14. The battery pack as claimed in claim 1, wherein a diameter of the coupling groove is inversely proportional to a depth of the coupling groove.

15. The battery pack as claimed in claim 1, wherein the coupling groove includes a burr prevention space adjacent to the coupling member and having a diameter d2, and a main coupling groove area having a diameter d1, and the diameter of the burr prevention space d2 is greater than the diameter of the main coupling groove area d1.

17. The battery pack as claimed in claim 15, wherein the diameter d2 of the burr prevention space is about 10 to about 30% greater than the diameter d1 of the main coupling groove area.

17. The battery pack as claimed in claim 1, wherein the cover is coupled to the coupling member and the coupling member is in contact with the cell.

* * * * *